United States Patent [19]
Danschikov et al.

[11] Patent Number: 5,492,657
[45] Date of Patent: Feb. 20, 1996

[54] METHOD FOR PROCESSING RUBBER PRODUCTS

[76] Inventors: Eugene V. Danschikov, V.38, r 122, Troitsk, Moscow Region; Igor N. Luchnik, Nahimovski Prospect. 7, K.2, r.183, Moscow; Alexander V. Ryazanov, Sirenev Bul., 3, r. 123, Troitsk, Moscow Region; Sergei V. Chiuko, Fersmana St., 9, r.4, Moscow, all of Russian Federation

[21] Appl. No.: 232,469

[22] Filed: Apr. 22, 1994

Related U.S. Application Data

[62] Division of Ser. No. 8,169, Jan. 25, 1993.

[51] Int. Cl.⁶ .................................................... B29B 17/02
[52] U.S. Cl. ...................... 264/37; 204/176; 264/83; 264/319; 264/DIG. 69; 422/186.07; 425/DIG. 46
[58] Field of Search .................... 264/83, 37, DIG. 69, 264/319; 425/DIG. 46; 34/201; 241/DIG. 30, DIG. 38; 422/186.07, 186.11, 186.12; 204/176; 585/241; 209/149

[56] References Cited

U.S. PATENT DOCUMENTS

| 4,956,405 | 9/1990 | Wheeler et al. | 209/149 |
| 5,264,640 | 11/1993 | Platz | 264/83 |
| 5,369,215 | 11/1994 | Platz | 264/DIG. 69 |
| 5,417,826 | 5/1995 | Blalock | 204/176 |

*Primary Examiner*—Mathieu D. Vargot
*Attorney, Agent, or Firm*—Dominik & Stein

[57] ABSTRACT

An apparatus and method for energy efficient recycling of reinforced rubber products, such as tires, conveyor belts, and the like, wherein the rubber is reinforced by cords or belts of steel, nylon, fabric and the like. The presence of the reinforcement materials poses not only a necessity to separate the rubber therefrom but also poses a problem of disposing of the reinforcement materials. By placing the reinforced rubber in an environment of ozone ($O_3$) and applying a force to the rubber, the rubber breaks down leaving the reinforcement materials for ready disposal. The method and apparatus thereby provide an energy efficient, cost-effective, and environmentally safe and acceptable technique for recycling reinforced rubber products.

19 Claims, 2 Drawing Sheets

METHOD FOR PROCESSING RUBBER PRODUCTS

This is a division of application Ser. No. 08/008,169 filed on Jan. 25, 1993.

FIELD OF THE INVENTION

The present invention relates to the disposal of rubber products, more specifically to recycling of rubber products, and still more specifically to reinforced rubber products.

BACKGROUND OF THE INVENTION

The present invention is directed to the disposal of scrap or used rubber products, and more specifically to reinforced rubber products such as automobile and truck tires, conveyor belts and the like and still more particularly to a method and apparatus utilizing ozone ($O_3$) to destroy or disintegrate the rubber and rubber products and separate the rubber from the reinforcement materials.

The disposal of various used or spent rubber products, especially reinforced rubber products such as tires, conveyor belts, and the like, has long been recognized as a major environmental problem. The recycling of solid waste materials, particularly reclaimable, useful materials, such as tires from automobiles, trucks and tractors and such is of great importance from the standpoint of conservation of resources as well as pollution abatement.

It has been estimated that over 280 million spent rubber tires are discarded every year in the United States and over two billion scrap tires litter the landscape, dumped in land-fills or oceans off-shore. Most of the discarded tires are located in open dumps where they collect rain or run-off water and serve as fertile breeding grounds for mosquitoes, rats and other pests.

In earlier years, these scrap tires were burnt in open pits or furnaces causing enormous air pollution problems in terms of the noxious gases produced during combustion. A common disposal method currently in use is burying them in land-fills but this method has its own attendant problems in that it fills up valuable space fast and more additional sites need to be found. Furthermore, the tires when buried whole under eight feet or so of soil or solid waste, refuse to stay buried and float to the top. Another method for the disposal of spent tires consists of cutting up or shredding the tires prior to dumping them in land-fills. However, cutting equipment to dispose of the tires efficiently is costly and requires frequent replacement or repairing of the cutting tools or surfaces, especially if the tires are reinforced with steel wires and fiber mesh. More recently, scrap tires are being considered as a source of fuel and are being used in large incinerators to extract energy therefrom. See M. W. Mayo et al., "Processing Scrap Tires For Multiple Markets," Solid Waste & Power, March/April, 1992.

In recent times, automotive tires have been reinforced with fiber and steel or other metal belts or cords for greater durability and stability. With the advent of fabric and metal reinforcement of tires, and the reduction of the tire recapping industry because of the difficulty in recapping reinforced tires, the presence of steel and other materials poses additional difficulties in the disposal of these materials. Efforts have been directed to removing the reinforcement materials from the rubber prior to disposal but the disposal of the reinforcement material in and of itself poses an additional pollution problem.

Methods of alleviating some of these disposal problems include using tire sections for decorative purposes, cutting of the rubber from the reinforcement materials, shredding the tires, cooling the tire pieces to the brittling temperature of rubber and pulverizing the rubber using sledge or drop hammers. The pulverized rubber is then used for various purposes such as asphalt paving, soles for shoes, to line land-fills and the like.

These prior art methods for the disposal and/or recycling of scrap or discarded tires are exemplified by U.S. Pat. Nos. 4,142,688 issued Mar. 6, 1979; 4,180,004 issued Dec. 25, 1979 to A. O. Johnson; 4,726,530 issued Feb. 23, 1988 to D. Miller et al; 4,757,949 issued Jul. 19, 1988 to N. P. Horton; 4,839,151 issued Jun. 13, 1989 to F. Apffel; 4,840,316 issued Jun. 20, 1989 to R. L. Barclay; 5,057,189 issued Oct. 15, 1991 to F. Apffel; 5,097,905 issued Mar. 10, 1992 to K. N. Murray; and 5,115,983 issued May 26, 1992 to D. Rutherford, Sr. In addition, efforts were also being made in other countries to address the pollution problem caused by scrap tires. These efforts are exemplified by U.S.S.R. Author Certificates Nos. 1685721 dated 05.06.89 and 1698075 dated 12.02.90; and British Patent Specification No. 1438278 by J. R. Lanning, published Jun. 3, 1976.

While these prior art approaches have served to reduce the volume of discarded tires and tire materials, the energy efficiency, cost-effectiveness and environmental efficacy of these prior efforts leave a great deal to be desired. Consideration must also be given to the capability of such approaches being readily portable for in situ applications, as well as the capability to be easily scaled up for large production-type facilities. While the prior systems may be environmentally acceptable that they may be located at sites remote from residential areas, they are not energy-efficient or cost effective in that the discarded tires need to be transported to the remote location. The processes involved are also energy-intensive which is a disadvantage in these times of a need for energy conservation. Some methods for tire disposal or treatment such as the recovery process disclosed in the Apffel patent '151 involves the pyrolysis of the tire consumes enormous amounts of energy. Similarly, the cold crushing method described by Lanning (Br. Pat. '278) requires the deep cooling of the tire, using liquid nitrogen, to its brittling temperature. Methods requiring either heating and cooling consume significant amounts of energy and make the operation prohibitively expensive. Therefore, there is a need in the art for a technique by which reinforced rubber products, such as tires, can be recycled, and which is energy-efficient, cost-effective and responsive to environmental concerns.

It has long been recognized that rubber is subject to oxygen and ozone degradation. In the manufacture of tires, for example, substantial efforts have been directed to eliminating or reducing ozone degradation by the addition of anti-oxidants to rubber formulations. These efforts are exemplified by U.S. Pat. Nos. 5,023,227 issued Jun. 11, 1991 to L. R. Evans et al; 5,025,066 issued Jun. 18, 1991 to J. L. De Rudder et al; 5,088,537 issued Feb. 18, 1992 to M. Kan; and 5,120,844 issued Jun. 9, 1992 to E. L. Wheeler et al. The time required for tire degradation with the ozone content in the atmosphere is much too long (more than one year) to be utilized for practical purposes. Even when the ozone concentrations are increased to environmentally acceptable levels, the degradation times of more than one week are still too long for practical applications. (Natural Rubber Science and Technology," Ed. A. D. Roberts, Oxford University Press, 1988). It has also been known that the relationship of the rate of rubber degradation to the ozone concentration is not linear even at low ozone concentration levels, especially in the presence of antioxidants. Beyond a certain threshold level of ozone concentration, the effect of the antioxidant is also suppressed, making this nonlinear relationship even more complex. For certain antioxidants, this threshold level is near 0.1% ozone. (M. Braden & A. N. Gent, J. Appl. Poly. Sci., 6, 449(1962).

Thus, while it has been widely recognized that the effects of ozone on tires needed to be addressed in the manufacture of tires, it has not been previously appreciated that this same tire degrading environment can be effective in the decomposition of tires for recycling purposes. It would be desirable, therefore, to have a method for the disposal of reinforced tires which does not require burning, cooling or shredding of the tire.

It is an object of the present invention, therefore, to provide a technique for the disposal of used or spent reinforced or unreinforced rubber products which is energy-efficient, cost-effective and environmentally responsible.

A further object of the invention is to provide a method for recycling reinforced rubber products.

Another object of the invention is to provide a readily portable apparatus for in situ disposal of used or spent reinforced rubber products.

Yet another object of the invention is to provide a method and apparatus for removing steel mesh or belts from steel-belted tires without destruction of the steel mesh or strands.

A further object of the invention is to provide a method and apparatus for the disposal of reinforced rubber products without significant heating or cooling of the rubber product.

A further object of the invention is to provide a method and apparatus for the disposal of used or spent reinforced or unreinforced rubber tires by placing the tires in an ozone atmosphere, either at room temperature or at lower or higher temperatures, and in a strained state causing rapid breakdown of the rubber.

Another object of the invention is to provide a method and apparatus for disposing of reinforced rubber tires which can be readily adapted for individual or continuous operation and can accommodate different tire sizes.

Additional objects, advantages and novel features of the invention will be set forth in part in the description which follows and the drawings incorporated hereinto, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects and in accordance with the purpose and principles of the present invention as embodied and broadly described herein, the present invention is directed to an apparatus and method for the recovery of rubber, metal and fiber products from scrap or spent rubber tires and other rubber products. The present invention provides a technique which utilizes a process wherein the discarded reinforced or unreinforced rubber products are exposed to ozone ($O_3$). The invention achieves the decomposition of spent or used tires without significant heating or cooling of the rubber tires, by placing discarded tires in a chamber containing ozone (0.01 to 30%) and by applying a pressure or loading force of at least 0.5 Kg/cm$^2$ or higher on the tires for deforming them. The relative strain level on the tire is about 3% or higher. The process may be carried out at any temperature although from a practical standpoint, the process is conveniently carried out at room or ambient temperature. The deformation process facilitates the breakdown of the rubber. The reinforcement materials released when the rubber breaks down may be readily removed for disposal or reuse. The remaining rubber pieces or powder are collected for recycling and any remaining ozone is recirculated or catalytically destroyed. Thus, the technique of this invention is simple in operation, energy efficient, cost-effective, and responsive to environmental concerns.

Basically the invention involves the disposal of used or spent reinforced rubber products, such as tires, wherein the product is placed in an ozone containing environment at room or ambient temperature, and is subjected to mechanical, static or other forms of deformation and strain on the rubber. Ozone concentrations may vary from about 0.01 to about 30% by weight or volume and preferably in the range of about 0.5 to about 10%. Deformation or strain levels may be varied from about 3 to 30%, preferably about 5 to 15%. A mechanical load of about 0.5 Kg/cm$^2$ produces a strain level of about 10%. By way of example, with an air/ozone mixture of 0.5% ozone ($O_3$) by volume and with a strain level near 0.5 Kg/cm$^2$, a conventional reinforced automobile tire can be disposed of in less than fifteen minutes. The invention can also be readily adapted for single or continuous tire disposal and can be readily transported.

BRIEF DESCRIPTION OF THE DRAWINGS

The accompanying drawings, which are incorporated into and for a part of the disclosure, illustrate embodiments of the apparatus for carrying out the invention and, together with the written description, serve to explain the principles of the invention.

DETAILED DESCRIPTION OF THE INVENTION

Figure 1:
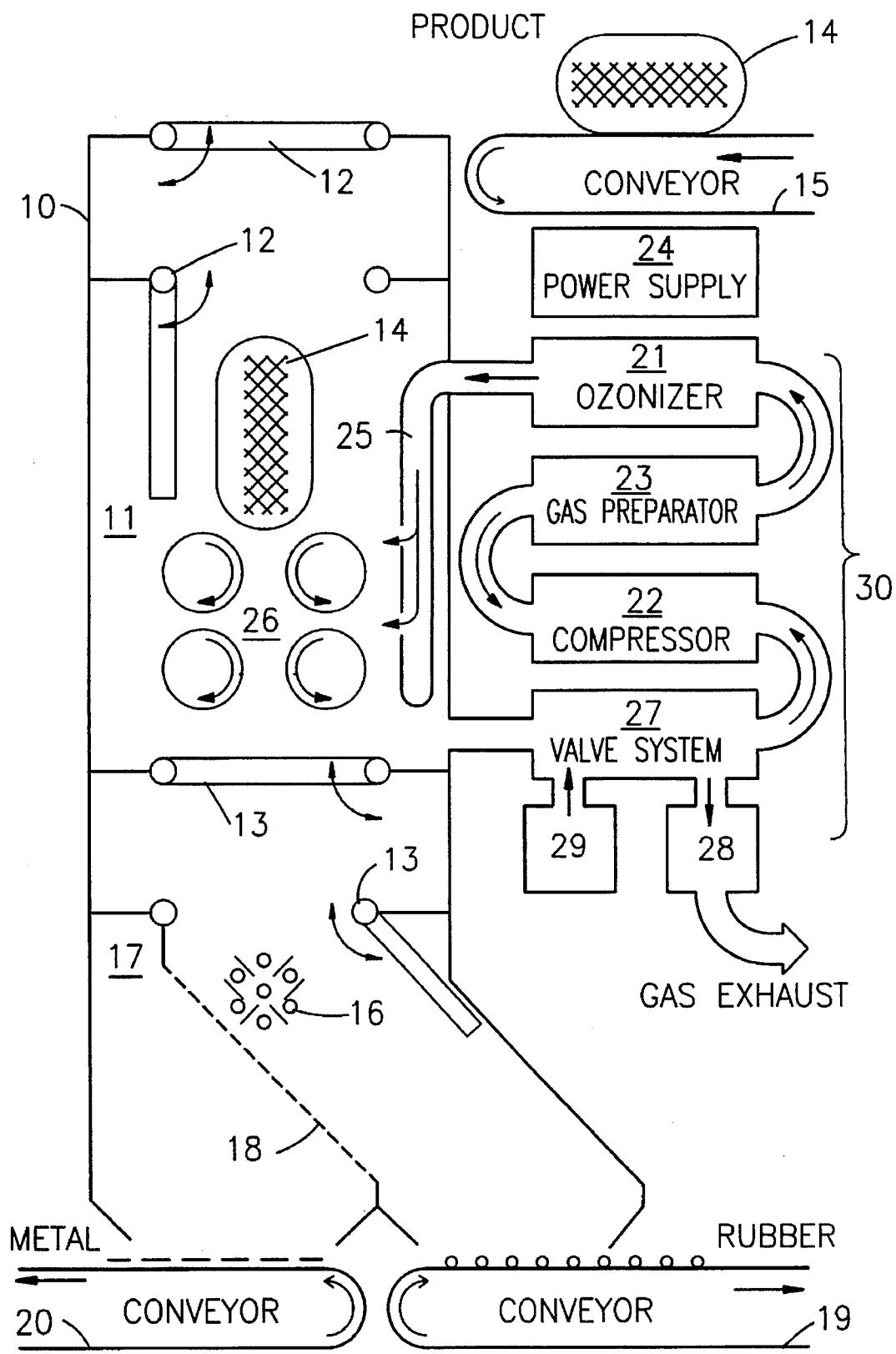
FIG. 1 is a schematic illustration of an embodiment of an apparatus made in accordance with the invention for carrying out a continuous process operation.

The present invention is directed to the disposal or recycling of used or spent rubber products, especially reinforced rubber tires or other products, and is particularly applicable for disposing of discarded or spent rubber tires reinforced with belts of fabric or steel, without destroying the material of the belts, while being energy efficient, cost-effective and environmentally safe. The apparatus is readily transportable, can be utilized for single or continuous operation, and thus can be easily transported to tire locations, such as dumps, land-fills, and depositories, without creating an environmentally polluting situation.

One purpose of the invention is to achieve the separation of, for example, the steel products from the rubber without mechanical cutting or abrasion of the whole product, or without significant heating or cooling of the rubber tire or other product, utilizing a process which may, conveniently, be carried out at room or ambient temperature. For destruction of the whole product (a steel-belted tire, for example) without cutting or sanding down the rubber tread, the product is placed in an ozone-containing gas or air mixture and then is to subjected to mechanical loading and deformation for providing a strained state of the rubber. After breakdown of the rubber and the disintegration of the whole product, any remaining ozone is withdrawn for recirculation or catalytically destroyed, and the steel elements are separated from the rubber fragments, particles or powder as the case may be. Ozone may be generated using known methods, with air or oxygen as the starting material.

In the method of this invention involving rubber destruction using ozone, the strained state of the rubber increases the rate of rubber disintegration. The processing at room or ambient temperature significantly decreases energy consumption and risks of fire hazards. To achieve the disintegration of rubber, only a small amount of ozone is necessary and the consumption of energy for ozone production is also small. Levels of ozone in the range of about 0.01 to 30%, preferably 0.5 to 10%, still more preferably about 0.1 to 1% by volume are normally utilized, depending upon the number of tires processed, energy availability and the type of operation, batch or continuous processing. Strain levels ranging from about 3 to 30%, preferably 3–10%, are utilized to conserve energy. A mechanical strain of about 0.5 Kg/cm$^2$ produces a strain level of about 3%–5%.

During experimental testing of this invention, spent automobile tires reinforced with steel cords were placed in a closed chamber. Air containing 0.1–1% of ozone was pumped through the chamber, and the tires were exposed to a shrinking and stretching strain by placing a weight thereon, such that the loading was from 10–200 Kg to achieve a quality of relative deformation from 1–10%. This treatment resulted in the disintegration of the treads and outside part of the tires and separation of the steel wires from the rubber fragments. The time necessary for the achievement of the tire disintegration was 5–10 minutes. It was also found that increasing the ambient ozone concentration and increasing the strain loading within the stated range, decreased the destruction or disintegration time.

In terms of the measurement of ozone consumption made during the initial testing of the invention, the amount of ozone necessary for strained tire destruction is less than 10 gm of ozone per kilogram of tire weight. The energy expense of ozone production is equal to 16 KW hour per kilogram of ozone for air ozonation and 8 KW hour for oxygen ozonation. Energy expenses for the creation of strain which keeps the tires in a deformed state, whether mechanical or static, are a small part of the total energy expense and less than expenses involved in repeated shock strain used in prior known techniques. Thus, by processing of a strained reinforced rubber product in an ozone-rich gas mixture, the aim of the invention is achieved.

By withdrawal and recirculation of the ozone remaining in the reaction chamber or by catalytically destroying any residual ozone in the chamber, there is no adverse environmental impact from ozone use. The process can, thus, be carried out in any location, and need not be located in remote areas resulting in additional transportation costs.

Time of processing decreases with increasing ozone concentration, but increasing the ozone in a gas mixture above 10% is inexpedient because of the significant increase in energy expenses for ozone production. The efficacy of ozone may be increased by the inclusion of appropriate additives which do not negatively contribute to environmental concerns. Decreasing ozone concentration below 0.01% and decreasing load strains below about 0.5 Kg/cm$^2$ increase processing time considerably. Thus, the preferred range of ozone in the gas mixture is about 0.05 to 10% with a mechanical load or strain of at least 0.5 Kg/cm$^2$. When the load on the tire is about 10–200 Kg to produce a deformation of 1–10% of the tire volume, the time period for processing the spent tire is about 5 to 10 minutes.

For the operation of a large plant and the continuous processing of large quantities of rubber products such as reinforced rubber tires, the energy expenditure determines the total costs of the processing operation. In such a case, it is more economical to produce ozone from oxygen with small energy expenditure and locate the plant at or near an oxygen generation facility to minimize transportation costs. Such a continuous processing plant is shown in FIG. 1.

For a portable tire processing station or unit, which can be easily transported to the location of a tire dump site or the like, factors such as transportation or other processing costs may make it more economical and expedient to produce ozone from atmospheric air. The air may be dried, cooled or otherwise treated using known methods if preferred to facilitate the process. The air may also be used without further drying to minimize operation costs if the moisture content is not too high. A portable unit such as the one just described is illustrated in FIG. 2.

Figure 2:
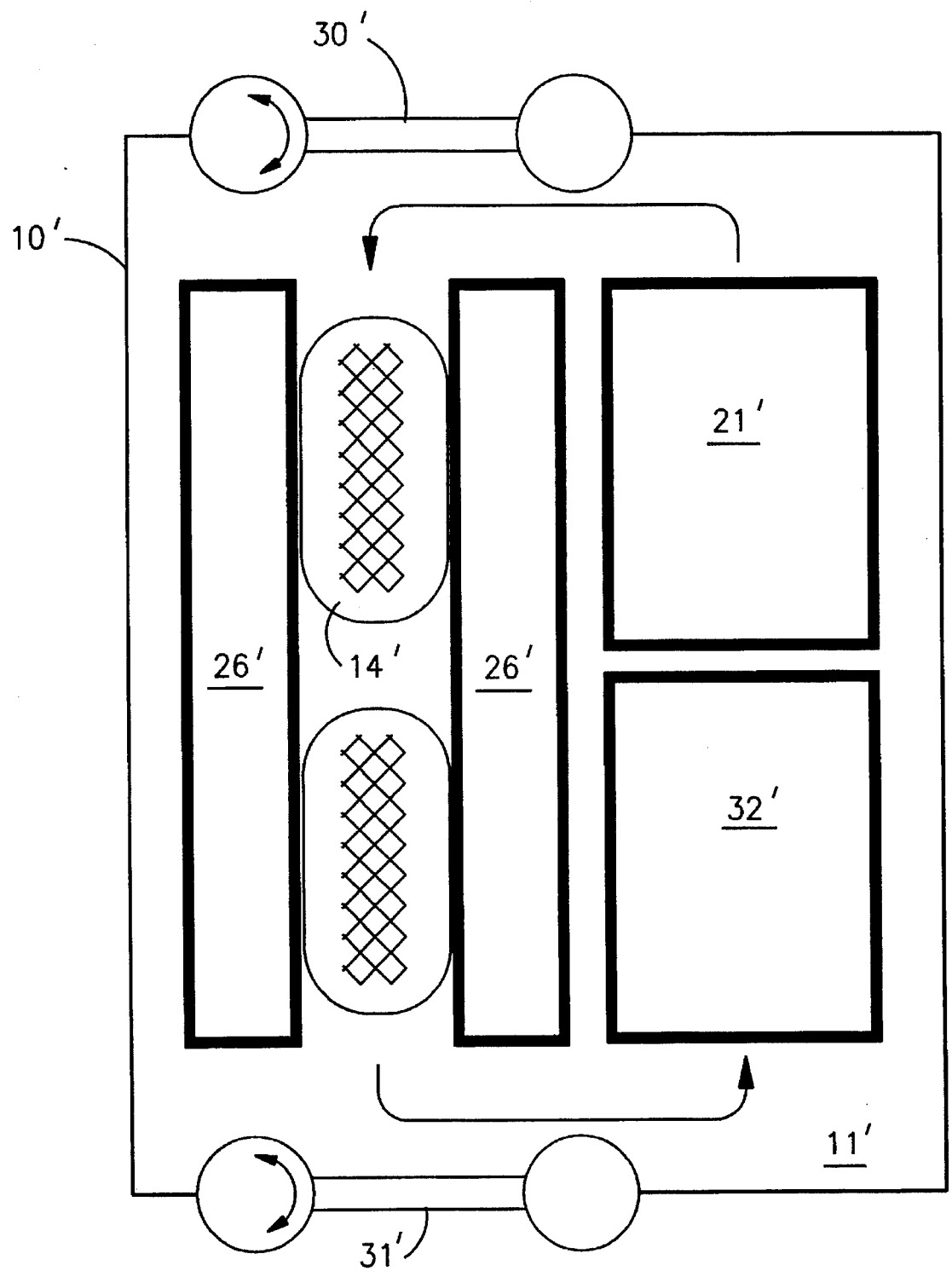
FIG. 2 is a schematic illustration of an embodiment of a portable apparatus for carrying out the process for single or several tires as a batch process.

Installation and apparatii for carrying out the invention both in the continuous and batch-wise mode are illustrated in FIGS. 1 and 2. FIG. 1 illustrates an apparatus for the continuous processing of steel belted rubber tires and similar products while FIG. 2 illustrates a portable or relocatable apparatus for batch-type or single tire processing.

As show in the FIG. 1 schematic illustration, the apparatus broadly comprises a housing 10 defining therein a treatment or decomposition chamber 11 and input and output sluice-gates 12 and 13. Product 14 is loaded by means of feed conveyor 15 through input sluice-gate 12 into treatment chamber 11. Product fragments 16 remaining after ozone treatment are removed from chamber 11 through output sluice-gate 13. While not shown, sluice gates 12 and 13 are provided with seals to ensure that there is no leakage of the ozone/gas mixture therethrough. The construction and operation of such seals in known in the art.

The fragments 16 which may consist of pieces of rubber and metal wires or fabric threads, are passed through separation chamber 17. Chamber 17 includes a separator 18 which separates metal or fabric from the rubber. Separator 18, schematically illustrated in FIG. 1, may be a sieve or a movable magnet assembly. When the reinforcement material of product 14 is non-metallic such as nylon or fabric, separator 18 may include an extendable arm or belt assembly or an air-flow arrangement designed to collect the nonmetallic components and removing the same from the flow of fragments 16. Conveyor 19 removes pieces of rubber for further treatment such as, for example, a shredder or pulverizer. Conveyor 20 removes metallic wires for compaction or further treatment.

A gas circulation assembly generally indicated at 30 comprises an ozonizer 21, gas preparator 23, compressor 22, valve system 27, a gas source 29 and an ozone destroyer 28. Gas source 29 may be an oxygen producing apparatus, oxygen gas cylinder, air cylinder or an air compressor. Valve system 27 controls the rate of ozone flow into and out of chamber 11 through sluice gates 12 and 13, gas preparator 23, compressor 22 and ozone destroyer 28. Ozone destroyer 28 may be a catalytic or other type of apparatus known in the art for destroying ozone. Other remaining, nontoxic gases may be removed from ozone destroyer 28 by an exhaust system as known in the art.

Ozone ($O_3$) is directed into chamber 11 as an ozone/gas mixture where the ozone content constitutes about 0.01% to 10% by volume of the mixture. Ozonizer 21 is the source for the production of the ozone/gas mixture. The operation of an ozonizer for producing and controlling ozone/gas mixture is known in the art. Thus, the description thereof is deemed unnecessary. Either air or oxygen is pumped into ozonizer 21 by compressor/pump 22. The air may be dried over a suitable drying agent such as CaO, cooled after compression or otherwise suitably treated in gas preparator 23 prior to being pumped into ozonizer 21. Power to ozonizer 21 is supplied by the high voltage power supply 24.

Ozone containing gas mixture (air or oxygen) is directed into chamber 11 by gas distribution assembly 25 which directs it directly to deformation assembly 26 which may comprise rotating rollers as shown in FIG. 1. The rotating speed of rollers in roller assembly 26 may also be varied such that each roller rotates at a different speed, thereby subjecting the rubber tire to a stretching strain in addition to the strain produced by compression between the rollers. The rollers in assembly 26 are driven by a motor not shown in FIG. 1.

Roller assembly 26 is designed to cause a deformation of the product 14 and place a strain on the rubber to a level of at least 0.5 Kg/cm$^2$ for increasing the rate of product disintegration. As an alternative to assembly 26, a series of weights may be placed on the product 14 to produce the desired strain level.

Housing 10, input and output sluice gates 12 and 13 and roller assembly 26 may be constructed out of stainless steel, glass, wood, ozone-resistant plastic or other materials which are chemically compatible with the ozone/gas mixture used in treatment chamber 11.

FIG. 2 schematically illustrates a portable apparatus made in accordance with the invention for carrying out the disposal operation batch-wise for a single or multiple tire or other products.

FIG. 2 shows a housing 10' defining therein a treatment chamber 11' for disposal of product 14', ozonizer 21' and a ventilator 32'. Housing 10' is provided with sealable top access door 30' through which product 14' may be placed inside treatment chamber 11' and a bottom access door 31' through which rubber and nonrubber fragments remaining after treatment may be removed. The ventilator 32' provides and controls air/gas circulation inside chamber 11' through ozonizer 21' is such a way as to maintain the necessary ozone content in the gas mixture in chamber 11'.

The apparatus of FIG. 2 may be connected to other devices for further processing of the rubber and/or nonrubber fragments as described earlier. The apparatus of FIG. 2 may additionally include the ozone destroyer assembly 28 and the deformation assembly 26 of FIG. 1. It may include a mechanical press in place of the roller assembly.

The portable apparatus of FIG. 2 is simple in construction and requires small amounts of energy for operation.

It has thus been shown that the invention provides a method and apparatus for destruction or disintegration of used or spent reinforced or unreinforced rubber products, such as steel-belted tires or conveyor belts, which is energy efficient, cost-effective, and environmentally non-polluting. By placing a product, such as a tire in an ozone-containing gas mixture with an ozone concentration in the range of from 0.01 to 10% and then exposing the tire to mechanical or static deformation causing a strained condition of the rubber with a strain level of at least 0.5 Kg/cm$^2$, the rubber breaks down whereafter the reinforcement material can be recovered or removed therefrom.

While specific embodiments of the apparatus have been illustrated and/or described for carrying out the method of the invention, other apparatus which comprise the basic features required for rubber product disintegration may be utilized. It has thus been shown that the present invention provides an apparatus and a method which overcomes the problems of the prior art methods while enabling scale-up to accommodate high-volume throughput for tire treatment. Thus, the present invention provides a substantial advance in the state of this art.

The foregoing description of the preferred embodiments of the subject invention have been presented for purposes of illustration and description and for a better understanding of the invention. It is not intended to be exhaustive or to limit the invention to the precise form disclosed; and, obviously, many modifications and variations are possible in the light of the above teaching. The particular embodiments were chosen and described in some detail to best explain the principles of the invention and its practical application thereby to enable others skilled in the relevant art to best utilize the invention in various embodiments and with various modifications as are suited to the particular use contemplated. It is intended that the invention be defined by the claims appended hereto.

What is claimed is:

1. An energy efficient, cost effective and environmentally safe process for disposing of reinforced rubber products, comprising the steps of:

positioning a reinforced rubber product in a chamber, exposing the rubber product to ozone, deforming the rubber product so as to create a strain on the rubber, maintaining the deformed rubber product in the ozone for a period of time to disintegrate the rubber product to thereby separate the rubber from a reinforcement material, and removing the disintegrated rubber product from the chamber.

2. The process of claim 1, wherein the step of exposing is carried out by directing a flow of an ozone/gas mixture into the chamber.

3. The process of claim 2, additionally including the step of forming the ozone/gas mixture so as to contain from about 0.01% to about 10% ozone.

4. The process of claim 2, additionally including the step of forming the ozone/gas mixture using a gas selected from the group consisting of air and oxygen.

5. The process of claim 2, wherein the step of deforming the rubber product to produce the strain is carried out so as to result in a strain load of at least 0.5 Kg/cm$^2$, and a deformation of about 1 to 10%.

6. The process of claim 1, wherein the step of deforming the rubber product and creating a strain on the rubber is carried out by mechanical means capable of producing a strain load of at least 0.5 Kg/cm$^2$.

7. The process of claim 1, additionally including the step of withdrawing any residual ozone from the chamber prior to the step of separating the rubber from the reinforcement material.

8. The process of claim 1, wherein the step of exposing the rubber product to ozone is carried out by providing an ozonizer for generating an ozone/gas mixture composed of 0.01 to 10% ozone.

9. The process of claim 8, wherein the step of deforming the rubber product so as to create a strain on the rubber is carried out by mechanically compressing the rubber product to generate a strain of at least 0.5 Kg/cm$^2$ on the rubber.

10. The process of claim 9, wherein said rubber product is reinforced with metal or fiber belts.

11. The process of claim 10, wherein the step of separating the rubber from the reinforcement material is carried out by collecting the reinforcement material within the chamber and removing the same from the chamber, and removing the rubber from the chamber.

12. The process of claim 11, additionally including the steps of withdrawing any residual ozone from the chamber prior to the separating step, and processing the residual ozone.

13. The process of claim 12, wherein the step of processing the residual ozone is carried out by operations composed of recirculating the residual ozone back into the chamber.

14. The process of claim 12, wherein the step of processing the residual ozone is carried out by operations composed of destroying the residual ozone catalytically.

15. The process of claim 14, wherein said rubber product is an automobile or truck tire.

16. A method for the decomposition of rubber tires reinforced with steel belts comprising the steps of:

positioning the tire in a chamber, placing the tire under load to deform the tire and create a strained state of the rubber, directing an ozone/gas mixture into the chamber, maintaining the tire in the ozone/gas mixture for a period of time to cause decomposition of the tire, and separating the steel belts from the rubber.

17. The method of claim 16, additionally including the step of generating the ozone/gas mixture so as to be composed of 0.01 to 10% ozone.

18. The method of claim 17, wherein the step of placing the tire under load is carried out so as to create a strain level of at least 0.5 Kg/cm$^2$.

19. The method of claim 18, wherein said ozone/gas mixture is formed from a mixture of ozone and air containing 0.1 to 1% ozone, wherein the load on the tire is 10–200 Kg to produce a deformation of 3–30%, and wherein the time period is 3 to 30 minutes.

* * * * *